United States Patent
Laor et al.

(10) Patent No.: US 6,754,409 B2
(45) Date of Patent: Jun. 22, 2004

(54) PLANAR ARRAY OPTICAL SWITCH AND METHOD

(75) Inventors: Herzel Laor, Boulder, CO (US); Leo A. Plouffe, Pascong, RI (US); David A. Krozier, N. Attleboro, MA (US)

(73) Assignee: AFN, LLC, Boulder, CO (US)

( * ) Notice: Subject to any disclaimer, the term of this patent is extended or adjusted under 35 U.S.C. 154(b) by 0 days.

(21) Appl. No.: 10/222,750

(22) Filed: Aug. 15, 2002

(65) Prior Publication Data

US 2003/0142900 A1 Jul. 31, 2003

Related U.S. Application Data

(63) Continuation of application No. 09/326,122, filed on Jun. 4, 1999, now Pat. No. 6,466,711.
(60) Provisional application No. 60/088,075, filed on Jun. 5, 1998.

(51) Int. Cl.[7] ................................................. G02B 6/26
(52) U.S. Cl. ............................................................ 385/16
(58) Field of Search ............................. 385/16–24, 147

(56) References Cited

U.S. PATENT DOCUMENTS

| | | | |
|---|---|---|---|
| 2,982,859 A | 5/1961 | Steinbrecher | 250/205 |
| 3,349,174 A | 10/1967 | Warschauer | |
| 3,492,484 A | 1/1970 | Iti | 250/199 |
| 3,649,105 A | 3/1972 | Treuthart | 350/285 |
| 3,990,780 A | 11/1976 | Dakss | 350/96 |
| 4,003,655 A | 1/1977 | Wasilko | 356/4 |
| 4,179,183 A | 12/1979 | Tateoka et al. | 350/6.1 |
| 4,198,116 A | 4/1980 | Papuchon | 350/96.14 |
| 4,208,094 A | 6/1980 | Tomlinson, III et al. | 350/96.2 |
| 4,234,145 A | 11/1980 | Leiboff | 244/3.16 |
| 4,236,783 A | 12/1980 | Hepner et al. | 350/96.13 |
| 4,249,814 A | 2/1981 | Hull et al. | 354/154 |
| 4,303,302 A | 12/1981 | Ramsey et al. | 350/96.2 |
| 4,303,303 A | 12/1981 | Aoyama | 350/96.2 |
| 4,304,460 A | 12/1981 | Tanaka et al. | 350/96.16 |
| 4,322,126 A | 3/1982 | Minowa et al. | 350/96.2 |
| 4,365,863 A | 12/1982 | Broussaud | 350/96.15 |

(List continued on next page.)

FOREIGN PATENT DOCUMENTS

| | | | | |
|---|---|---|---|---|
| GB | 1160546 | 9/1966 | | |
| GB | 2 214 810 A | 2/1990 | | |
| JP | A 0066154 | 5/1980 | | |
| JP | A 0192233 | 8/1989 | | |
| JP | 5-107485 | 4/1993 | ........... | G02B/26/08 |

OTHER PUBLICATIONS

Dakin, J. P., Fibre Optics '84, SPIE vol. 468, 1984, pp. 219–225.
Henderson, W., Fibre Optics '89, Spie vol. 1120, 99–103.

*Primary Examiner*—Akm Enayet Ullah
(74) *Attorney, Agent, or Firm*—Marsh Fischmann & Breyfogle LLP

(57) ABSTRACT

An optical switch device includes a first array (20) of reflectors (22), each associated with a separate optical fiber input (12), and a second array (30) of reflectors (32), each associated with a separate fiber output (14). The reflectors (22 and 32) are positionable to direct an optical signal from any one of the fiber inputs (12) to any one of the fiber outputs (14). The optical signal is directed along an optical pathway between the desired fiber output (14) and its associated reflector that is substantially aligned with an axis extending centrally from the fiber output. Preferably, symmetrical fiber beam forming units for forming the optical signal into a focused beam are included between the fiber inputs (12) and the first array as well as between the second array (20) and the fiber outputs (14). A method for switching optical signals between an input and an output optical fiber end involves forming the optical signal emitted from the input fiber end into a focused beam wherein rays from a point on the input fiber end are convergent. The focused beam is directed towards the output fiber end using at least two positionable reflectors oriented to direct the signal so that, prior to reaching the fiber output, it propagates along an optical pathway that is substantially aligned with an axis extending centrally from the output fiber end.

3 Claims, 14 Drawing Sheets

U.S. PATENT DOCUMENTS

| | | | |
|---|---|---|---|
| 4,431,258 A | 2/1984 | Fye | 350/1.6 |
| 4,432,599 A | 2/1984 | McMahon | 305/96.15 |
| 4,470,662 A | 9/1984 | Mumzhiu | 350/96.15 |
| 4,498,730 A | 2/1985 | Tanaka et al. | 350/96.16 |
| 4,574,191 A | 3/1986 | Conrad | 250/203 |
| 4,603,975 A | 8/1986 | Cinzori | 356/152 |
| 4,613,203 A | 9/1986 | Proetel et al. | 350/6.6 |
| 4,614,868 A | 9/1986 | Alster | 250/227 |
| 4,626,066 A | 12/1986 | Levinson | 350/96.18 |
| 4,644,160 A | 2/1987 | Arimoto et al. | 250/201 |
| 4,657,339 A | 4/1987 | Fick | 350/96.2 |
| 4,714,326 A | 12/1987 | Usui et al. | 350/485 |
| 4,738,500 A | 4/1988 | Grupp et al. | 350/6.6 |
| 4,789,215 A | 12/1988 | Anderson et al. | 350/96.19 |
| 4,790,621 A | 12/1988 | Calaby et al. | 350/96.2 |
| 4,796,263 A | 1/1989 | Rampolla | 372/10 |
| 4,812,005 A | 3/1989 | Heywang | 372/6 |
| 4,814,600 A | 3/1989 | Bergstrom | 250/221 |
| 4,818,052 A | 4/1989 | LePesant et al. | 350/96.15 |
| 4,820,045 A | 4/1989 | Boisde et al. | 356/319 |
| 4,823,402 A | 4/1989 | Brooks | 455/607 |
| 4,838,631 A | 6/1989 | Chande et al. | 350/6.6 |
| 4,838,637 A | 6/1989 | Torok et al. | 350/96.18 |
| 4,859,012 A | 8/1989 | Cohn | 350/96.24 |
| 4,927,225 A | 5/1990 | Levinson | 350/96.18 |
| 4,932,745 A | 6/1990 | Blonder | 350/96.2 |
| 4,988,157 A | 1/1991 | Jackel et al. | 350/96.13 |
| 4,993,796 A | 2/1991 | Kapany et al. | 350/96.15 |
| 5,005,934 A | 4/1991 | Curtiss | 350/96.18 |
| 5,028,104 A | 7/1991 | Kokoshvili | 350/91.15 |
| 5,030,004 A | 7/1991 | Grant et al. | 356/153 |
| 5,031,987 A | 7/1991 | Norling | 350/96.15 |
| 5,150,245 A | 9/1992 | Smithgall | 359/117 |
| 5,157,903 A * | 10/1992 | Nakashima et al. | 53/504 |
| 5,199,088 A | 3/1993 | Magel | 385/18 |
| 5,204,922 A | 4/1993 | Weir et al. | 385/18 |
| 5,205,104 A * | 4/1993 | Nakashima et al. | 53/64 |
| 5,208,880 A | 5/1993 | Riza et al. | 385/18 |
| 5,221,987 A | 6/1993 | Laughlin | 359/222 |
| 5,255,332 A | 10/1993 | Welch et al. | 385/17 |
| 5,271,075 A | 12/1993 | Gfeller et al. | 385/20 |
| 5,291,324 A | 3/1994 | Hinterlong | 359/135 |
| 5,317,659 A | 5/1994 | Lee | 385/22 |
| 5,420,946 A | 5/1995 | Tsai | 385/22 |
| 5,436,986 A | 7/1995 | Tsai | 385/16 |
| 5,440,654 A | 8/1995 | Lambert, Jr. | 385/17 |
| 5,453,827 A | 9/1995 | Lee | 356/73.1 |
| 5,524,153 A | 6/1996 | Laor | 385/16 |
| 5,546,484 A | 8/1996 | Fling et al. | 385/16 |
| 5,548,669 A | 8/1996 | Anderson et al. | 385/15 |
| 5,594,820 A | 1/1997 | Garel-Jones et al. | 385/22 |
| 5,627,669 A | 5/1997 | Orino et al. | 359/156 |
| 5,629,993 A | 5/1997 | Smiley | 385/22 |
| 5,647,033 A | 7/1997 | Laughlin | 385/16 |
| 5,671,304 A | 9/1997 | Duguay | 385/17 |
| 5,956,441 A | 9/1999 | Fairchild et al. | 359/131 |
| 5,999,555 A | 12/1999 | Connors et al. | 372/99 |
| 6,031,946 A * | 2/2000 | Bergmann et al. | 385/18 |
| 6,289,145 B1 * | 9/2001 | Solgaard et al. | 385/17 |
| 6,320,996 B1 * | 11/2001 | Scobey et al. | 385/18 |
| 6,327,398 B1 * | 12/2001 | Solgaard et al. | 385/17 |
| 6,430,332 B1 * | 8/2002 | Laor et al. | 385/18 |

* cited by examiner

IMAGING PROPERTIES OF $d_1$ ONTO $D_2$   $D_2 = d_1 \cdot \dfrac{u_1}{V}$

IMAGING OF $d_2$ ON $D_1$   $D_1 = d_2 \cdot \dfrac{u_2}{V}$

PLANAR ARRAY OPTICAL SWITCH AND METHOD

RELATED APPLICATION INFORMATION

This application is a continuation of U.S. patent application Ser. No. 09/326,122 entitled "Planar Array Optical Switch and Method", filed on Jun. 4, 1999, now U.S. Pat. No. 6,466,711, which claims priority from U.S. Provisional Application Serial No. 60/088,075 entitled "Planar Array Optical Switch" filed on Jun. 5, 1998.

FIELD OF THE INVENTION

The present invention relates generally to fiber optic switches, and, more particularly, concerns a device and method for direct switching of optical signals between input and output optical fibers with minimal optical losses.

BACKGROUND OF THE INVENTION

Due to advantages over conventional electrical transmission mediums such as increased bandwidth and improved signal quality, the use of fiber optics in communications networks has become commonplace. However, as with electrical signals transmitted over wires which need to be switched between various wires in order for the signals to reach their intended destinations, optical signals similarly need to be switched between different optical fibers at appropriate junctions so that the optical signals reach their intended destinations.

One method of switching an optical signal between fibers is to convert the optical signal to an electrical signal, employ conventional electronic switching components to switch the electrical signal, and then re-convert the electrical signal to an optical signal. An alternative approach is to employ direct optical switching wherein the optical signal is directed between fibers. The latter approach has distinct theoretical advantages, including an increase in switching speed and a reduction in signal degradation, because it eliminates the optical-to-electrical and electrical-to-optical conversions.

When implementing direct optical switching, it is desirable to have the capability to switch an optical signal from any one of a number of optical fibers entering a junction (input fibers) to any one of a number of optical fibers exiting a junction (output fibers). Several ways of achieving this have been previously proposed. One way is to bend the ends of the selected input and desired output fibers such that the two fibers point at one another (directly or via a folded optical pathway) providing a direct optical pathway for the optical signal between the fibers. The use of fixed reflectors, such as mirrors, in conjunction with bending the fiber ends has also been previously proposed. The fiber ends are not bent to point at one another, but rather are directed at one or more reflectors so that an optical signal from the input fiber is reflected to the output fiber.

SUMMARY OF THE INVENTION

One object of the present invention is to provide for direct switching of optical signals between optical fibers.

The present inventor has recognized that to achieve efficient and accurate switching of the optical signal when implementing direct optical switching, it is desirable that the optical signal be directed from the input fiber such that it enters the output fiber along an optical pathway that is in substantial alignment with the output fiber. Accordingly, another object of the present invention is to provide for direct switching of optical signals between input and output optical fibers wherein the optical signal enters the output fiber along an optical pathway that is in substantial alignment with the output fiber.

The present inventor has also recognized that forming the optical signal into a focused beam, as opposed to a collimated or other diverging signal, before directing it to the output fiber with one or more reflectors is desirable in order to reduce loss of the optical signal and improve effectiveness of the switching operation. Accordingly, a further object of the present invention is to provide for direct switching of optical signals between input and output optical fibers wherein the optical signal emitted from the input fiber is formed into a focused beam before directing it to the output fiber with one or more reflectors.

These and other objectives and advantages of the present invention are achieved by various aspects of the present invention. According to one aspect of the invention, first and second reflectors, for example mirrors, are provided wherein the first reflector is associated with the input fiber and the second reflector is associated with the output fiber. The first reflector receives the optical signal from the input fiber and is oriented so that it reflects the optical signal in a manner such that it reaches the second reflector, either directly from the first reflector or by further reflection off of other reflectors. The second reflector receives the reflected optical signal and is oriented so that the optical signal is further reflected to the output fiber along an optical pathway having an axis that is in substantial alignment with the axis of the output fiber.

In another aspect of the present invention, the first reflector does not reflect the optical signal directly to the second reflector. Rather, the optical signal from the input fiber is reflected by the first reflector to a third reflector which then reflects the optical signal to the second reflector. Further reflectors may be employed. For example, in one embodiment, the first reflector reflects the optical signal to a third reflector, which reflects the optical signal to a fourth reflector, which, in turn, reflects the optical signal to the second reflector.

In yet another aspect of the present invention, multiple reflectors are arranged into first and second arrays of reflectors, with each reflector of the first array being associated with a separate one of a plurality of input fibers and each reflector of the second array being associated with a separate one of a plurality of output fibers. The reflectors of the first and second arrays are positionable in a plurality of orientations relative to a reference orientation. For example, the reflectors of the first and second arrays may be rotatable about at least one axis of rotation to allow for positioning of the reflectors in a plurality of orientations. An optical signal may be switched between any selected one of the input fibers and any selected one of the output fibers by positioning the reflector of the first array associated with the selected input fiber in an orientation such that the optical signal is reflected, either directly or by additional reflectors, to the reflector of the second array associated with the desired output fiber. Preferably, the reflector of the second array associated with the selected output fiber is correspondingly positioned in an orientation such that the optical signal incident thereon is reflected along an optical pathway having an axis substantially aligned with the desired output fiber.

A still further aspect of the present invention involves a beam-forming unit associated with an input fiber and an associated beam-directing system for directing the beam on an optical path towards a selected output fiber. The beam forming unit associated with the input fiber receives the optical signal emitted from the end of the selected input fiber and forms it into a focused beam, as opposed to a collimated or other diverging signal. The focused beam optical signal is then directed by the beam-directing system to the selected output fiber. The output fiber is preferably associated with a lens arranged in a focused configuration relative to the beam-forming unit and the output fiber. It will thus be appreciated that a symmetric optical pathway is defined whereby an optical signal from the input fiber is made to enter the end of the output fiber. This arrangement allows for efficient bi-directional communication between the input and output fibers (the "input" and "output" labels being merely a convenience).

One more aspect of the present invention involves a method for switching optical signals between an input fiber and an output fiber. The method involves forming the optical signal into a focused beam, directing the beam towards the output fiber along an optical pathway that is, prior to the beam reaching the output fiber, substantially aligned with the output fiber, and receiving the optical signal on the end of the output fiber. A symmetrical focused beam forming unit comprised of a first focused beam forming unit and a second, substantially identical focused beam forming unit may be employed in the forming and receiving steps to enhance optical signal transmission. The step of directing may be accomplished with two active reflectors each associated with one fiber.

These and other aspects and advantages of the present invention will be apparent upon review of the following detailed description when taken in conjunction with the accompanying figures.

DETAILED DESCRIPTION

The optical switch device and method of the present invention allow for switching optical signals between optical fibers. In a communications network, the fibers entering and exiting a junction may be bundled into one group of input fibers and one group of output fibers. The ends of the input and output fibers may further be arranged into two separate rectangular arrays. However, it should be appreciated that, in communications networks, as well as in other applications, the optical fibers may be arranged in other suitable manners. For example, the ends of the input and output fibers may be mixed together in one rectangular array. Furthermore, an individual fiber may function as an input fiber as well as an output fiber depending upon the direction of propagation of the optical signal in a bi-directional communication environment. Accordingly, although the following description includes references to input and output fibers for purposes of illustration, it will be understood that each of the fibers may send and receive optical signals.

In the embodiments of the present invention discussed below individual reflectors arranged into one or more arrays of reflectors may be included. In the discussion that follows, an individual reflector of an array of reflectors will be referenced as the (i,j) reflector where i identifies the row and j the column of the specific reflector (for purposes of generality, such two-dimensional nomenclature will be used even in the case of linear arrays). Individual input and output fibers will be referenced in a like manner.

Planar Switch

Figure 1:
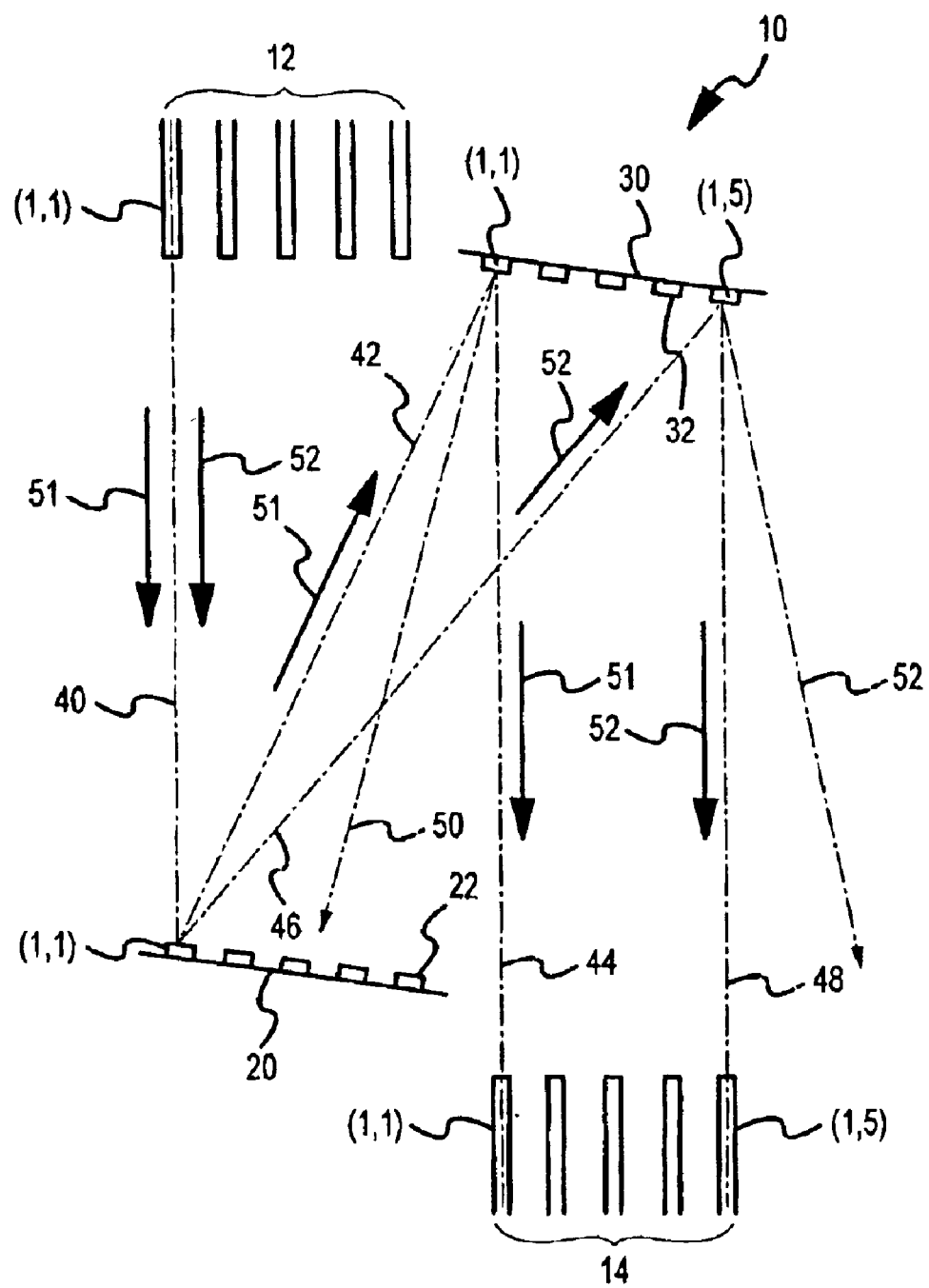
FIG. 1 is a top view illustrating a 5×5 planar array switch embodiment of the present invention.

Referring now to FIG. 1, there is illustrated one embodiment of an optical switch device 10 in accordance with the present invention. For simplicity of illustration, a linear array switch is illustrated in FIG. 1 and more practical two-dimensional array switches will be discussed below. The optical switch device 10 is adapted to function with a linear array of five optical fibers 12 and a linear array of five optical fibers 14. This switch device 10 is referred to as a 5×5 planar array switch because it may switch an optical signal between any one of the five fibers 12 arranged in a line (and therefore coplanar with one another) and any one of the five fibers 14 also arranged in a line. It should be appreciated that although a 5×5 planar array switch is illustrated, the present invention contemplates, in general, M×N planar array switches wherein an optical signal may be switched between any one of M fibers 12 and any one of N fibers 14 (M may equal N or they may differ).

The optical switch device 10 includes a first array 20 of five individual reflectors 22 arranged in a line and a second array 30 of five individual reflectors 32 arranged in a second line. Each of the individual reflectors 22 of the first array 20 corresponds with a separate one the fiber 12. For example, the (1,1) reflector 22 of the first array 20 corresponds with the (1,1) fibers 12. Likewise, each of the individual reflectors 32 of the second array 30 correspond with a separate one of the fiber 14. For example, the (1,1) reflector 32 of the second array 30 corresponds with the (1,1) fibers 14.

Signals are switched by the optical switch device 10 between any one of the fiber 12 and any one of the fibers 14 in the following manner. A first optical signal (shown diagrammatically by arrow S1) emitted from the (1,1) fibers 12 propagates along an optical pathway 40 to the (1,1) reflector 22 of the first array 20. To switch the first optical signal S1 to the (1,1) fiber 14, the (1,1) reflector 22 of the first array 20 is oriented so that first optical signal S1 is reflected along optical pathway 42 to the (1,1) reflector 32 of the second array 30. The (1,1) reflector 32 of the second array 30 is correspondingly oriented so that it then reflects the first optical signal S1 along optical pathway 44 to the (1,1) fiber output 14. It is important to note that the axis of optical pathway 44 is in substantial alignment with an axis extending centrally from the (1,1) fiber 14. If the (1,1) reflector 32 of the second array 30 is not properly oriented, first optical signal S1 may be reflected along any one of a number of optical pathways not in substantial alignment with the axis of the (1,1) fiber 14, such as optical pathway 50, impairing the switching operation. The (1,1) reflector 32 of the second array 30 could be oriented to direct an optical signal to the (1,5) fiber 14 if desired. However, such an arrangement would not provide optimal optical efficiency because the Brightness Theorem (the Second Law of Thermodynamics as applied in optics) requires that active means (e.g. the reflectors 32 of the second array 30) be employed to condense the photons of the optical signal into a small diameter beam that fits the fiber 14 core. When fiber (1,1) in 12 is aligned to (1,1) in 14, light may travel also from (1,1) of 14 to (1,1) of 12.

A second optical signal (shown diagrammatically by arrow S2) emitted from the (1,1) fiber 12 is switched to the (1,5) fiber 14 as follows. Second optical signal S2 propagates along optical pathway 40 to the (1,1) reflector of the first array 20 which is oriented so that second optical signal S2 is reflected along optical pathway 46 to the (1,5) reflector of the second array 30. The (1,5) reflector of the second array 30 is correspondingly oriented so that it then reflects second optical signal S2 along optical pathway 48 to the (1,5) fiber 14. As with optical pathway 44, optical pathway 48 is substantial in alignment with an axis extending centrally from the (1,5) fiber 14, and, in this arrangement, signals can also be communicated from (1,5) in 14 to (1,1) in 12. It will be appreciated that illustrated pathway 51 cannot co-exist with pathway 52 as reflector (1,1) of 20 can be in only one orientation at a time. If the (1,5) reflector of the second array 30 is not oriented properly, second optical signal S2 will be reflected along an optical pathway divergent from the axis of the (1,5) fiber 14, such as optical pathway 52, impairing the switching operation.

Figure 4:
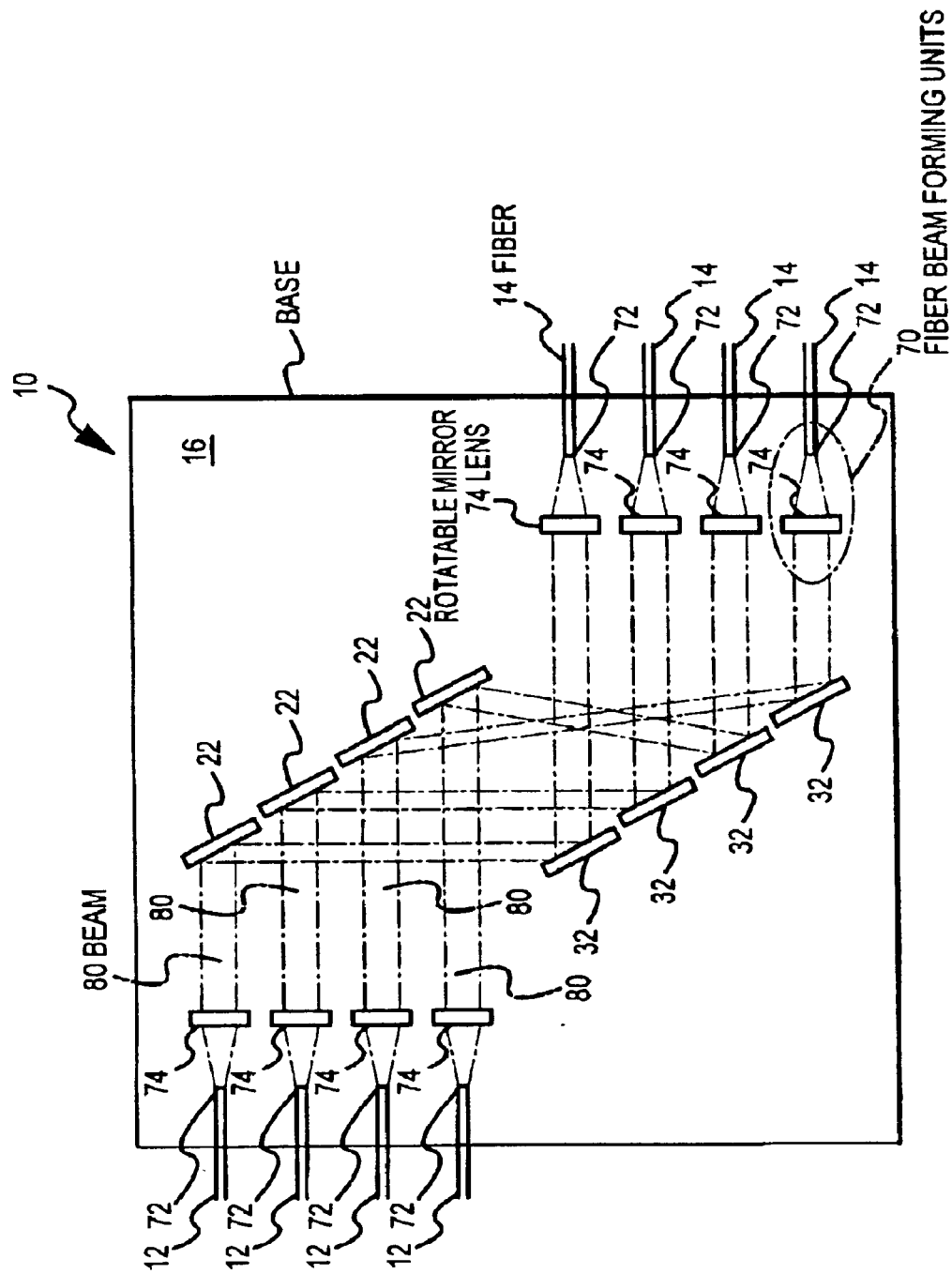
FIG. 4 is a top view illustrating 4×4 planar array switch embodiment of the present invention.

FIG. 4 shows a 4×4 implementation of the optical switch device 10 illustrated in FIG. 1. The optical switch device 10 includes a base 16. Each of the individual reflectors 22 of the first array 20 and reflectors 32 of the second array 30 are attached to the base 16. The reflectors 22, 32 may be rotatable about an axis of rotation perpendicular to the base 16 so that they may be oriented as necessary to switch optical signals. Each of the optical fibers 12, 14 is associated with a separate fiber beam forming unit 70. The fiber beam forming units 70 are comprised of an optical fiber end 72 and a lens 74 spaced apart from and coaxial with the optical fiber end 72. Each lens 74 of the fiber beam forming units 70 associated with the fibers 12 focuses an optical signal, such as visual light or infrared radiation, emitted from the fiber end 72 of its associated fiber 12 into a beam 80 incident on the reflector 22 of the first array 20 corresponding to the associated fiber input 12. Likewise, each lens 74 of the fiber beam forming units 70 associated with the fiber 14 receives a beam 80 from the reflector 32 of the second array 30 corresponding with the associated fiber 14 and focuses the optical signal beam 80 onto the fiber end 72 of the associated fiber 14.

To switch an optical signal between a selected fiber 12 and a selected fiber 14, the reflector 22 of the first array 20 corresponding with the selected fiber 12 is rotated so that the optical signal beam 80 from the lens 74 of the fibers beam forming unit 70 associated with the selected fiber 12 is reflected to the reflector 32 of the second array 30 corresponding with the selected fiber 14. The reflector 32 of the second array 30 corresponding with the selected fiber output 14 is rotated so that it reflects the beam 80 to the lens 74 of the fiber beam forming unit 70 associated with the selected fiber 14. As noted above, it is preferred that the beam 80 of the optical signal propagate along an optical pathway from the reflector 32 of the second array 30 to the lens 74 that is in substantial alignment with the axis of the selected fiber output 14. Once a connection is thereby configured between a fiber 12 and a fiber 14, two-directional communication is possible between the fibers 12 and 14. In the description below, the fibers are sometimes designated as "input fibers" or "inputs" and "output fibers" or "outputs" for purposes of convenience, but it will be appreciated that such switch configurations support and will normally involve two-directional communication between the connected fibers.

The optical switch device 10 shown in FIG. 4 may be implemented using micro electro mechanical (MEM) technology. The base 16 may include a circuit board or other support on which MEM chips for each of the reflector arrays 20, 30 are mounted. The fiber inputs and outputs 12, 14 may be positioned in V-grooves defined on the surface of the base 16. The lenses 74 may be Frenel Zone lenses made of silicone that are defined on the surface of the base 16 and propped up to a vertical position in front of the V-grooves such that the optical axis of the each lens 74 is parallel to the surface of the base 16. The reflectors 22, 32 may be mirrors also made of silicone and propped up to a vertical position with the ability to rotate about an axis perpendicular to the base 16. The optical switch device 10 should be constructed so as to maintain the optical signal beams 80 parallel to the surface of the base 16, Small adjustments may be made to the reflectors 22, 32 to achieve this objective.

Three-Dimensional Space Switches

As may be appreciated, the number of fiber inputs 12 and outputs 14 that can be accommodated by a planar array switch as described above is constrained by the practical limits of arranging fiber beam forming units 70 and reflectors 22, 32 in a line. To accommodate additional input and output fibers, the present invention contemplates the utilization of three-dimensional space.

Figure 2:
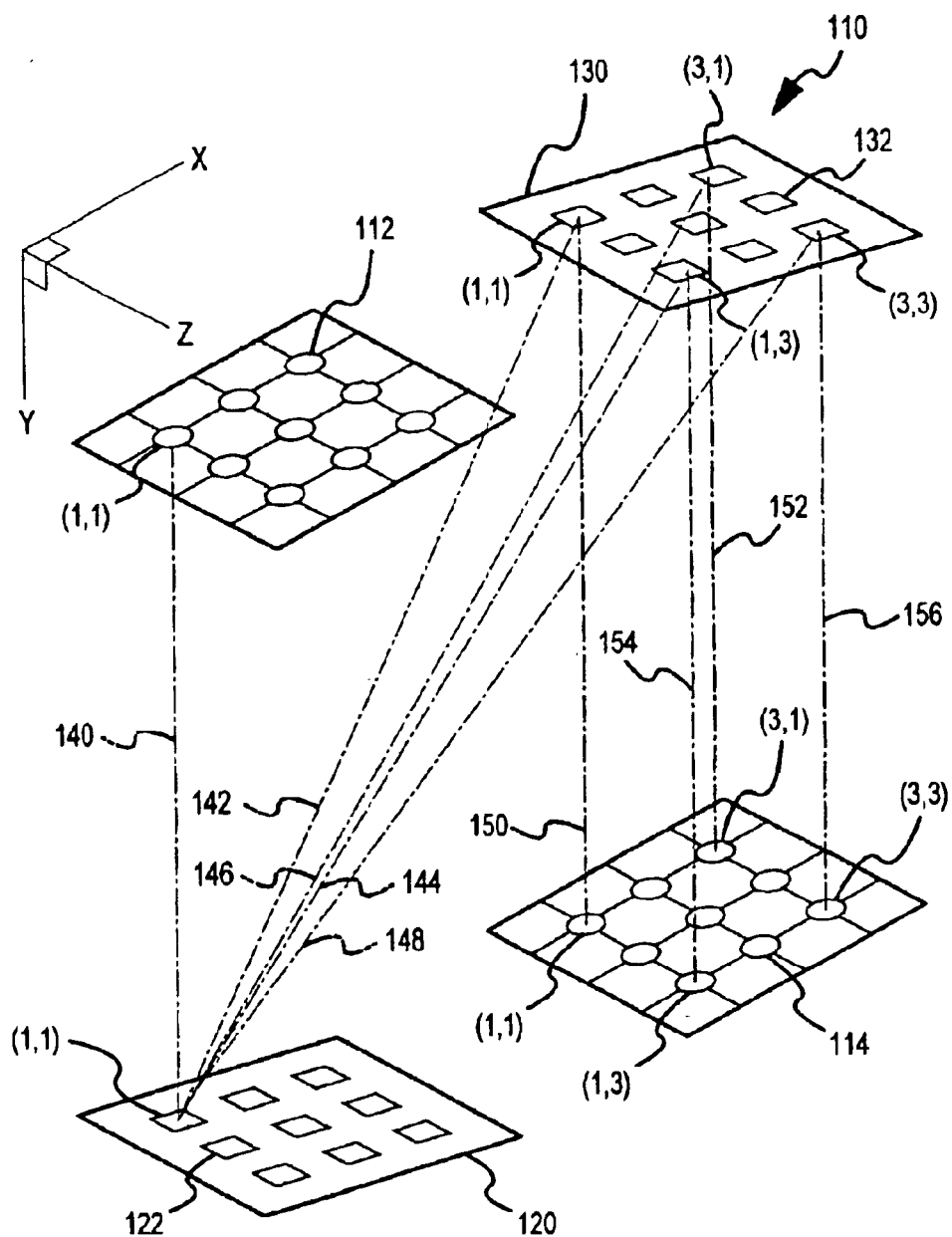
FIG. 2 is a perspective view illustrating a 9×9 matrix array switch embodiment of the present invention having two arrays of reflectors.

Referring now to FIG. 2 there is shown another embodiment of the optical switch device 110 of the present invention which is adapted to function with nine fiber inputs 112 arranged in a 3×3 rectangular array and nine fiber outputs 114 arranged in a second 3×3 rectangular array. This switch device 110 is referred to as a 9×9 matrix switch because it may switch an optical signal from any one of the nine fiber inputs 112 arranged in a matrix having three rows and three columns to any one of the nine fiber outputs 114 arranged in a matrix having three rows and three columns. It should be appreciated that although a 9×9 matrix switch is illustrated, the present invention contemplates, in general, M×N matrix switches wherein an optical signal may be switched from any one of M fiber inputs 112 to any one of N fiber outputs 114 (M may equal N or they may differ).

The optical switch device 110 includes a first 3×3 rectangular array 120 of individual reflectors 122 and a second 3×3 rectangular array 130 of individual reflectors 132. Each of the individual reflectors 122 of the first array 120 corresponds with a separate one of the fiber inputs 112 and each of the reflectors 132 of the second array corresponds with a separate one of the fiber outputs 114. The reflectors 122, 132 are rotatable about at least two orthogonal axes (here the x-axis and the z-axis of the reference axes illustrated) so that an optical signal may be switched from any one of the nine fiber inputs 112 to any one of the nine fiber outputs 114. For example, an optical signal emitted from the end of the (1,1) fiber input 112 propagates along optical pathway 140 to the (1,1) reflector 122 of the first array 120. The (1,1) reflector 122 is rotated to an orientation such that the optical signal is reflected along an optical pathway to the appropriate reflector 132 of the second array corresponding with the desired fiber output 114. For example, depending upon its orientation, the (1,1) reflector 122 of the first array may reflect the optical signal along optical pathways 142, 144, 146, 148 to the (1,1), (1,3), (3,1) or (3,3) reflectors 132, respectively, which are correspondingly rotated to reflect the signal along optical pathways 150, 152, 154, 156 to the (1,1), (1,3), (3,1) and (3,3) fiber outputs 114, respectively. Optical pathways 150, 152, 154, 156 between the second array 130 and the fiber outputs 114 are in substantial alignment with axes extending centrally from the corresponding fiber outputs 114.

Figure 5:
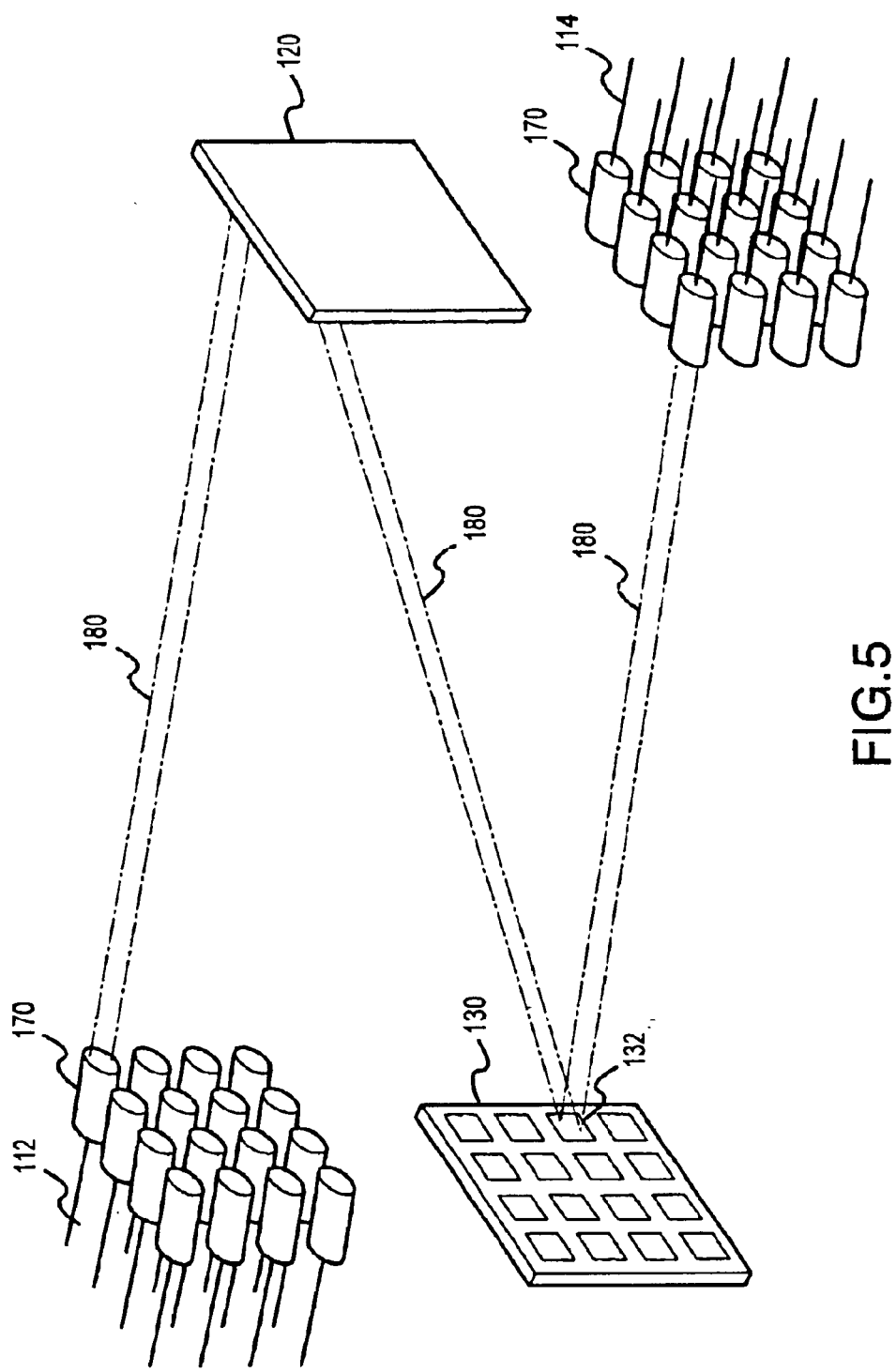
FIG. 5 is a perspective view illustrating a 16×16 matrix array switch embodiment of the present invention having two arrays of reflectors.
Figure 6:
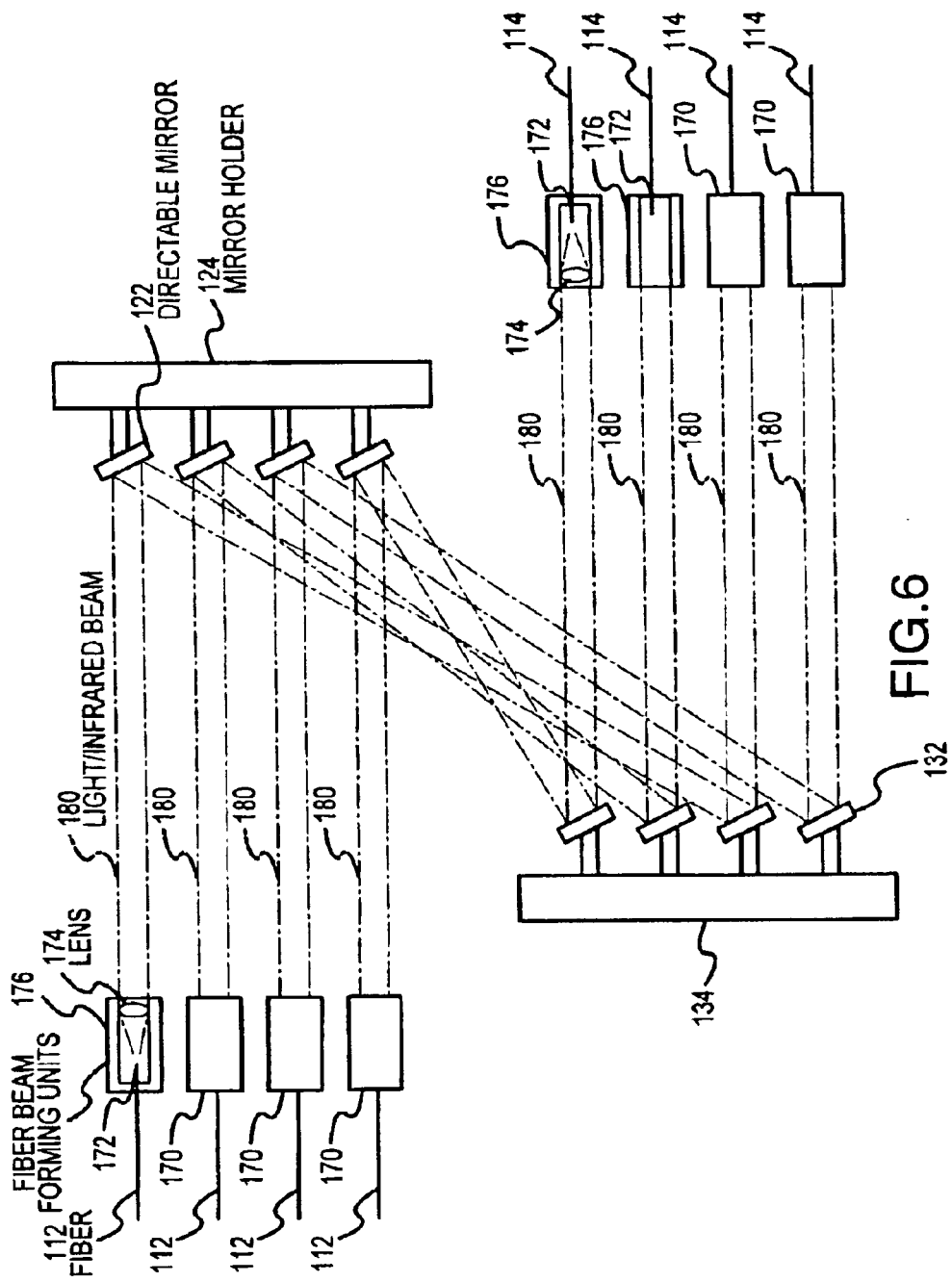
FIG. 6 is a side view of the embodiment of the present invention shown in FIG. 5.

A 16×16 implementation of the optical switch device 110 illustrated in FIG. 2 is shown in FIGS. 5 and 6. The first array 120 of reflectors 122 includes a first mirror holder 124. Each of the individual reflectors 122 of the first array 120 is attached to the first mirror holder 124 and is rotatable about at least two orthogonal axes. The second array 130 of reflectors 132 includes a second mirror holder 134. Each of the reflectors 132 of the second array 130 is attached to the second mirror holder 134 and is rotatable about at least two orthogonal axes. Each of the optical fiber inputs and outputs 112, 114 is associated with a separate fiber beam forming unit 170.

As shown in the side view of FIG. 6, the fiber beam forming units 170 are comprised of an optical fiber end 172 and a lens 174 disposed coaxial with the optical fiber end 172. The fiber beam forming units may also include a cylindrical sleeve 176 which is fitted over the fiber end 172 and lens 174. The lens 174 may be spaced from the fiber end 172 or they may be touching, e.g., in the case of a Graded Index (GRIN) lens or a thick lens. Each lens 174 of the fiber beam forming units 170 associated with the fiber inputs 112 focuses an optical signal, such as visual light or infrared radiation, emitted from the fiber end 172 of its associated fiber input 112 into a beam 180 incident on the reflector 122 of the first array 120 corresponding to the associated fiber input 112. Likewise, each lens 174 of the fiber beam forming units 170 associated with the fiber outputs 114 receives a beam 180 from the reflector 132 of the second array 130 corresponding with the associated fiber output 114 and focuses the optical signal beam 180 onto the fiber end 172 of the associated fiber output 114.

To switch an optical signal between a selected fiber input 112 and a selected fiber output 114, the reflector 122 of the first array 120 corresponding with the selected fiber input 112 is rotated so that the optical signal beam 180 from the lens 174 of the fiber beam forming unit 170 associated with the selected fiber input 112 is reflected to the reflector 132 of the second array 130 corresponding with the selected fiber output 114. The reflector 132 of the second array 130 corresponding with the selected fiber output 114 is rotated so that it reflects the beam 180 to the lens 174 of the fiber beam forming unit 170 associated with the selected fiber output 114. As noted above, it is important that the beam 180 of the optical signal propagate along an optical pathway from the reflector 132 of the second array 130 to the lens 174 that is in substantial alignment with the axis of the selected fiber output 114. It is also noted that the beam 180 from the fiber 112 is aligned with the mirror 122.

Figure 7:
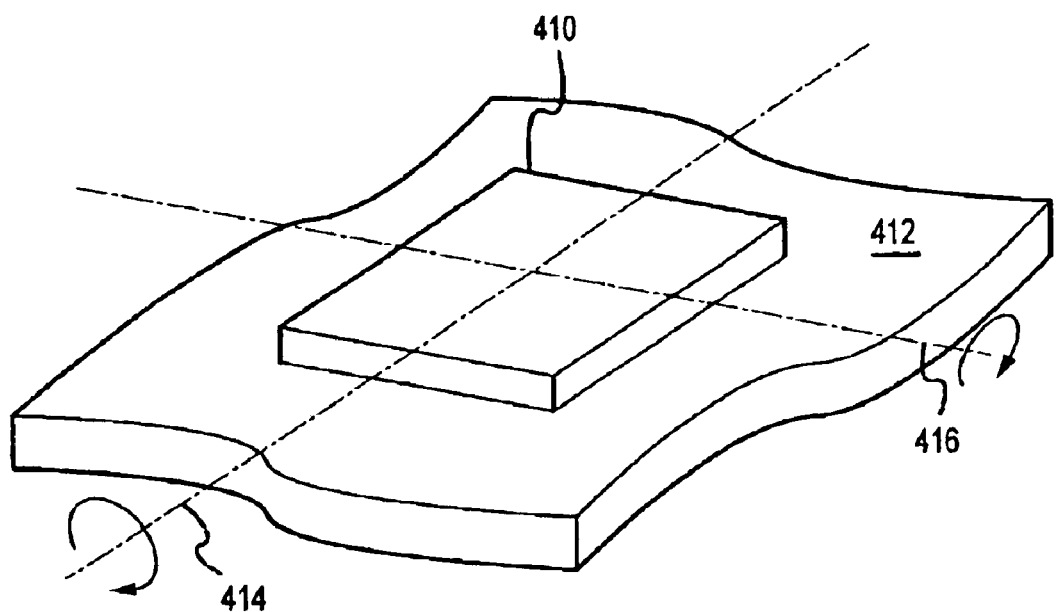
FIG. 7 is a perspective view illustrating a micro electro mechanical mirror appropriate for use as a reflector in the various embodiments of the present invention.

FIG. 7 shows one of the reflectors 122, 132 of the optical switch device 110 illustrated in FIGS. 2, 5 and 6. While many different types of reflectors having appropriate reflective properties may be employed, the reflector in the illustrated embodiment is a chip mounted, micro electro mechanical (MEM) mirrors such as those manufactured by Texas Instruments. The MEM mirror 410 is constructed of silicone and is mounted on an MEM chip 412. The mirror 410 is capable of controlled rotational movement in two degrees of freedom about two orthogonal axes 414, 416. The orthogonal axes 414, 416 are parallel with the chip surface.

Figure 3:
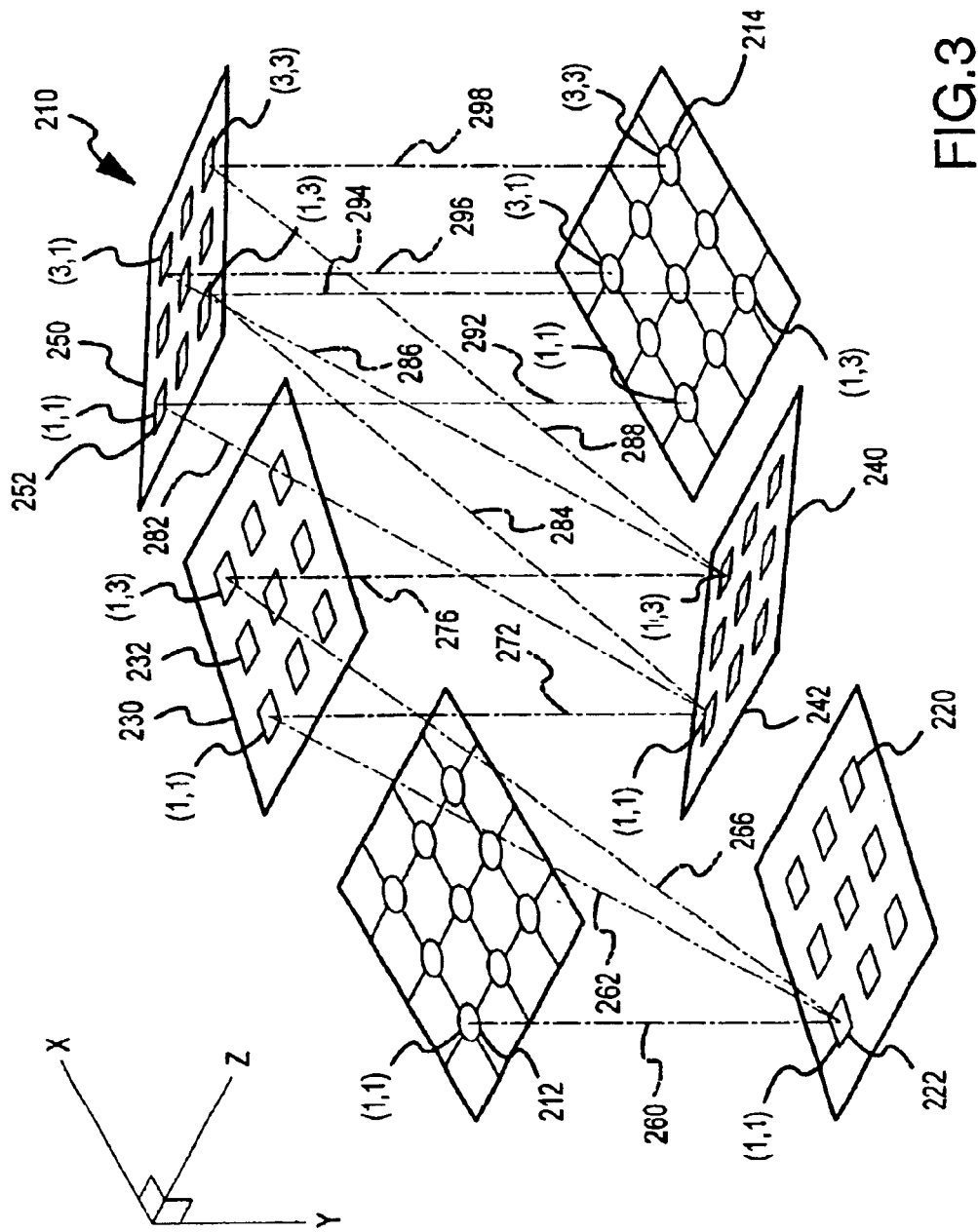
FIG. 3 is a perspective view illustrating a 9×9 matrix array switch embodiment of the present invention having four arrays of reflectors.

FIG. 3 illustrates another embodiment of the optical switch device 210 of the present invention. As with the embodiment illustrated in FIG. 2, this optical switch device utilizes three-dimensional space and is also a 9×9 matrix switch for switching optical signals from any one of nine fiber inputs 212 arranged in a matrix having three rows and three columns to any one of nine fiber outputs 214 arranged in a second matrix having three rows and three columns. However, it should be appreciated that the optical switch device 210 illustrated in FIG. 3 may generally be an M×N matrix switch.

The optical switch device 210 includes a first 3×3 rectangular array 220 of nine reflectors 222, a second 3×3 rectangular array 230 of nine reflectors, a third 3×3 rectangular array 240 of nine reflectors 242 and a fourth 3×3 rectangular array 250 of nine reflectors 252. Each of the reflectors 222 of the first array 220 corresponds with a separate one of the fiber inputs 212 and each of the reflectors 252 of the fourth array 250 corresponds with a separate one of the fiber outputs 214. To allow switching of a signal from any one of the fiber inputs 212 to any one of the fiber outputs 214, each of the reflectors 222, 242 of the first and third arrays 220, 240 are rotatable about an axis of rotation parallel with the z-axis of reference illustrated and each of the reflectors 232, 252 of the second and third arrays 230, 250 are rotatable about an axis of rotation parallel with the x-axis of reference illustrated. The reflectors 222, 232, 242, 252 may be of the same type as those illustrated in FIG. 7, with the exception that they need only be free to rotate about one axis.

The following examples illustrate how the optical switch device 210 switches an optical signal from any one of the fiber inputs 212 to any one of the fiber outputs 214. An optical signal from the (1,1) fiber input 212 propagates along optical pathway 260 to the (1,1) reflector 222 of the first array 220. To switch the signal to the (1,1) fiber output 214, the (1,1) reflector 222 of the first array 220, the (1,1) reflector 232 of the second array 230, the (1,1) reflector 242 of the third array 240, and the (1,1) reflector 252 of the fourth array 250 are each rotated to appropriate orientations such that the optical signal is reflected along optical pathways 262, 272, 282, 292 from the (1,1) reflector 222 of the first array 220 to the (1, 1) reflector 232 of the second array 230 to the (1,1) reflector 242 of the third array 240 to the (1,1) reflector 252 of the fourth array 250 to the (1,1) fiber output 214. To switch the signal to the (1,3) fiber output 214, the (1,1) reflector 222 of the first array 220, the (1,1) reflector 232 of the second array 230, the (1,1) reflector 242 of the third array 240, and the (1,3) reflector 252 of the fourth array 250 are each rotated to appropriate orientations such that the optical signal is reflected along optical pathways 262, 272, 284, 294 from the (1,1) reflector 222 of the first array 220 to the (1,1) reflector 232 of the second array 230 to the (1,1) reflector 242 of the third array 240 to the (1,3) reflector 252 of the fourth array 250 to the (1,3) fiber output 214. To switch the signal to the (3,1) fiber output 214, the (1,1) reflector 222 of the first array 220, the (3,1) reflector 232 of the second array 230, the (3,1) reflector 242 of the third array 240, and the (3,1) reflector 252 of the fourth array 250 are each rotated to appropriate orientations such that the optical signal is reflected along optical pathways 266, 276, 286, 296 from the (1,1) reflector 222 of the first array 220 to the (3,1) reflector 232 of the second array 230 to the (3,1) reflector 242 of the third array 240 to the (3,1) reflector 252 of the fourth array 250 to the (3,1) fiber output 214. To switch the signal to the (3,3) fiber output 214, the (1,1) reflector 222 of the first array 220, the (3,1) reflector 232 of the second array 230, the (3,1) reflector 242 of the third array 240, and the (3,3) reflector 252 of the fourth array 250 are each rotated to appropriate orientations such that the optical signal is reflected along optical pathways 266, 276, 288, 298 from the (1,1) reflector 222 of the first array 220 to the (3,1) reflector 232 of the second array 230 to the (3,1) reflector 242 of the third array 240 to the (3,3) reflector 252 of the fourth array 250 to the (3,3) fiber output 214. It is important to note that the optical pathways 292, 294, 296, 298 between the reflectors 252 of the fourth array 250 and the fiber outputs 214 are in substantial alignment with axes extending centrally from the corresponding fiber outputs 214.

Figure 8:
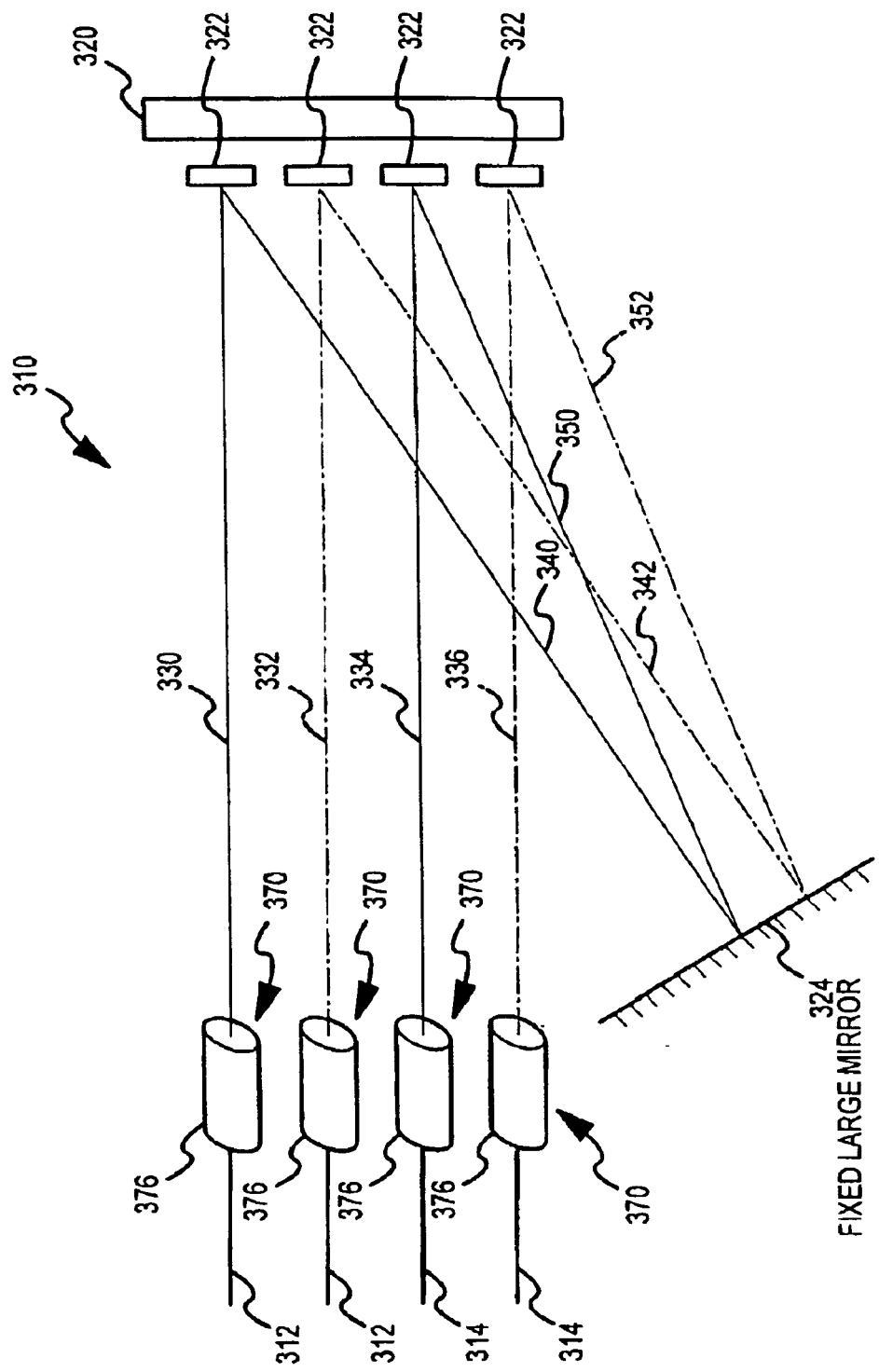
FIG. 8 is a side view illustrating a 4×4 matrix array switch embodiment of the present invention configured for use with one array of input and output fibers.

Referring now to FIG. 8, there is shown an additional embodiment of the optical switch device 310 of the present invention. The optical switch device 310 also utilizes three-dimensions and is adapted for switching an optical signal between any one of a number of fibers 312 and any other one of the fibers 312, where the fibers 312 are arranged in a single array. Although a 1×4 linear array of fibers 312 is depicted, the optical switch device 310 can be adapted for use with a rectangular or other planar array of fibers 312. It should be appreciated that each of the fibers 312 can function as a transmitting fiber and a receiving fiber depending upon the direction of propagation of the optical signal. Thus, the switch device 310 depicted in FIG. 8 may be referred to as a 4×4 matrix array switch because it may switch an optical single from any one of four fibers 312 and to any other one of the four fibers 312.

The optical switch device 310 includes an array 320 of rotatable reflectors 322 and a fixed reflector 324 that is fixed relative to the array 320 of rotatable reflectors 322. Each of the rotatable reflectors 322 corresponds with a separate one of the fibers 312. The rotatable reflectors may be of the type shown in FIG. 7. The optical switch device 310 also includes fiber beam forming units 370 comprised of cylindrical sleeves 376 enclosing optical fiber ends (not shown) and lenses (not shown). A separate fiber beam unit 370 is associated with each one of the fibers 312.

An optical signal from any one of the fibers 312 is switched to any other one of the fibers 312 in the following manner. An optical signal from, for example, the (1,1) fiber 312 propagates along the optical pathway 330 between the fiber beam forming unit 370 associated with the (1,1) fiber 312 and the (1,1) rotatable reflector 322. The (1,1) rotatable reflector 322 is rotated such the optical signal is reflected to the fixed reflector 324 along optical pathway 340. The fixed reflector 324 reflects the optical signal along optical pathway 350 to the (1,3) rotatable reflector 322. The (1,3) rotatable reflector 322 is rotated such that it reflects the optical signal along optical pathway 334 to fiber beam forming unit 370 associated with the (1,3) fiber 312. Similarly, an optical signal from the (1,2) fiber 312 propagates along optical pathway 332 to the (1,2) rotatable reflector 322, which is rotated so that the optical signal is reflected along optical pathway 342 to the fixed reflector 324. The fixed reflector 324 reflects the optical signal along optical pathway 352 to the (1,4) rotatable reflector 322 which is rotated so that the optical signal is reflected along optical pathway 336 the fiber beam forming unit 370 associated with the (1,4) fiber 312. The optical pathways 330, 332, 334, 336 between the rotatable reflectors 322 and the fiber beam forming units 370 associated with their corresponding fibers 312 are in substantial alignment with axes extending centrally from the corresponding fiber 312.

Focused Beam Forming Units

As noted above, the embodiments illustrated may include a beam forming unit associated with each fiber input and output for forming optical signals into a beams. Such fiber beam forming units preferably form the optical signals into focused beams as opposed to collimated or other diverging signals.

Figure 9:
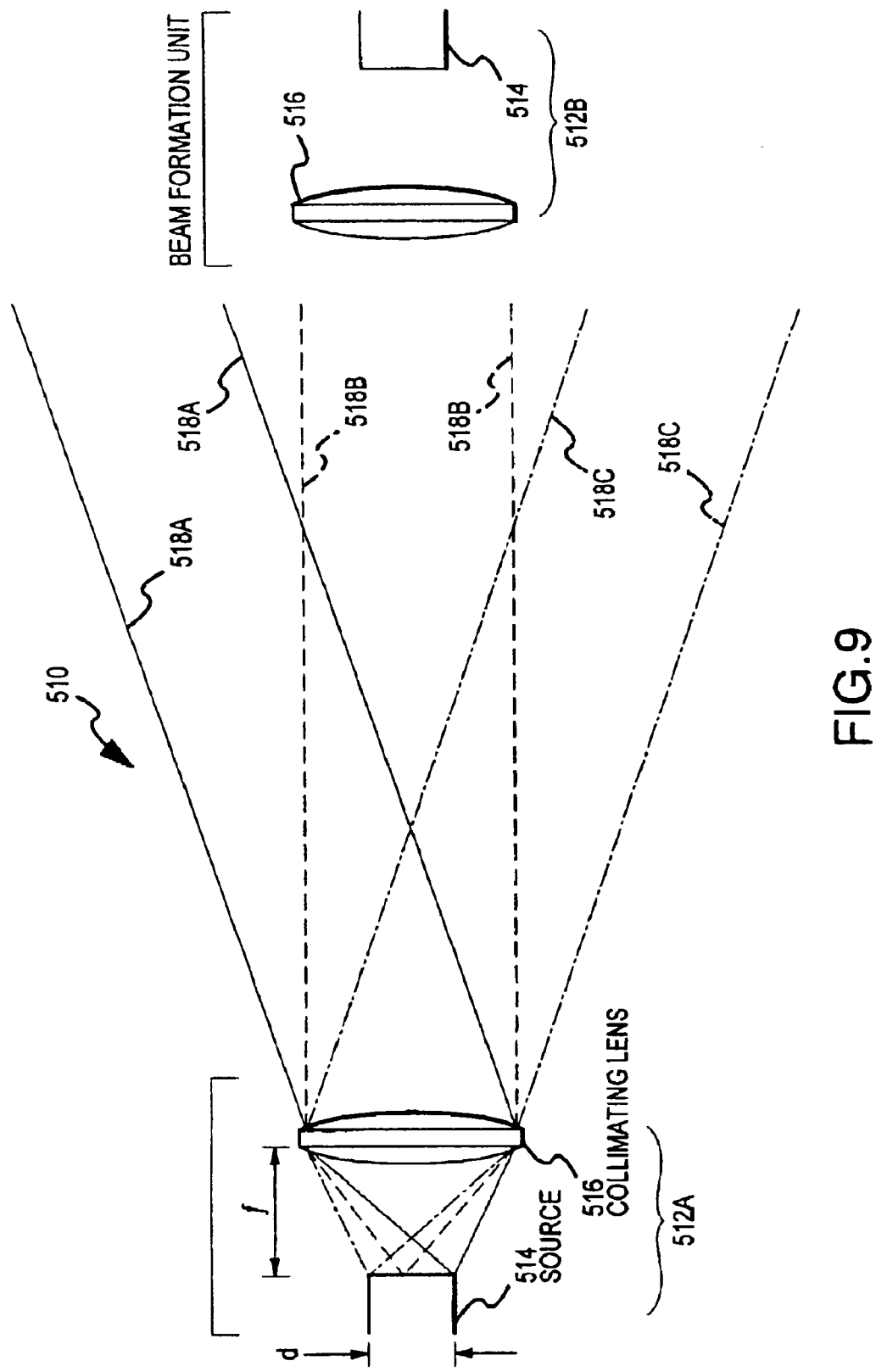
FIG. 9 illustrates a collimated beam formed by a collimated beam forming unit.
Figure 10:
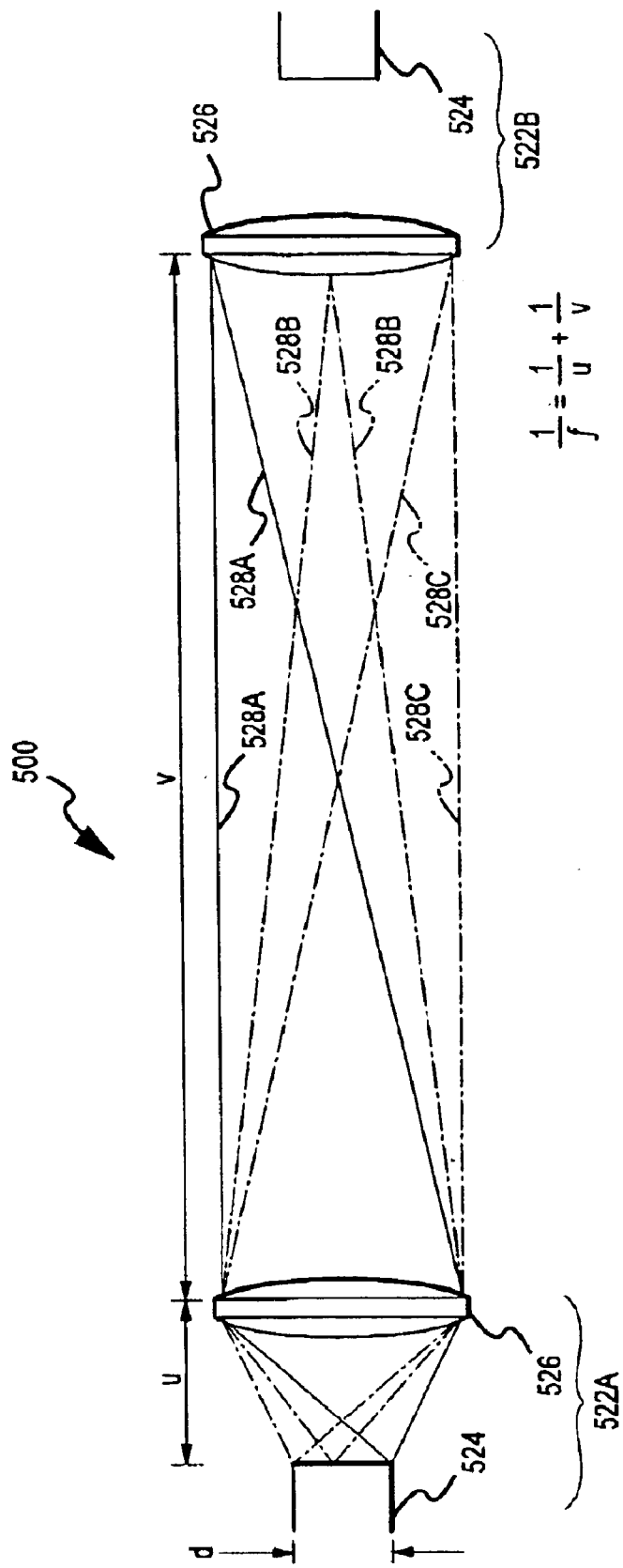
FIG. 10 illustrates a focused beam formed by a focused beam forming unit.

FIGS. 9 and 10 illustrate the differences between a collimated signal 510 formed by a collimated forming unit 512 and a focused beam 520 formed by a focused signal forming unit 522. As shown in FIG. 9, a first collimated beam forming unit 512A includes a source, such as an optical fiber end 514, from which an optical signal, such as infrared light, is emitted and a collimating lens 516. Since the optical fiber end 514 is not an infinitesimally small point source, rays of light from different points on the optical fiber end 514, such as rays 518A, 518B, 518C, are incident on the surface of the collimating lens 516 facing the optical fiber end 514. The collimating lens 516 directs the rays 518A, 518B, 518C such that rays from a particular point on the optical fiber end 514 exit the lens 514 in a parallel fashion. As can be seen in FIG. 9, because each of the rays 518A, 518B, 518C exit the lens 514 in a parallel fashion, much of the optical signal will not be incident on the lens 516 of a second fiber beam forming unit 512B to which the optical signal is directed causing much of the optical signal to be lost.

FIG. 10 shows a focused beam 520 formed by a first focused beam forming unit 522A. The first focused beam forming unit 522A includes a source, such as an optical fiber end 524, from which an optical signal, such as infrared light, is emitted and a focused lens 526. As with the first collimated beam forming unit 512A, rays of light from different points on the optical fiber end 524, such as rays 528A, 528B, 528C, are incident on the surface of the focused lens 526 facing the optical fiber end 524. Instead of directing the rays 528A, 528B, 528C from each point in a parallel fashion, the focused lens 526 directs the rays 528A, 528B, 528C such that the rays from a particular point on the optical fiber end 524 converge at one point on the surface of the focused lens 526 of the second focused beam forming unit 522B to which the optical signal is directed. Thus, much of the optical signal reaches its intended destination and signal losses are minimized.

Figure 11:
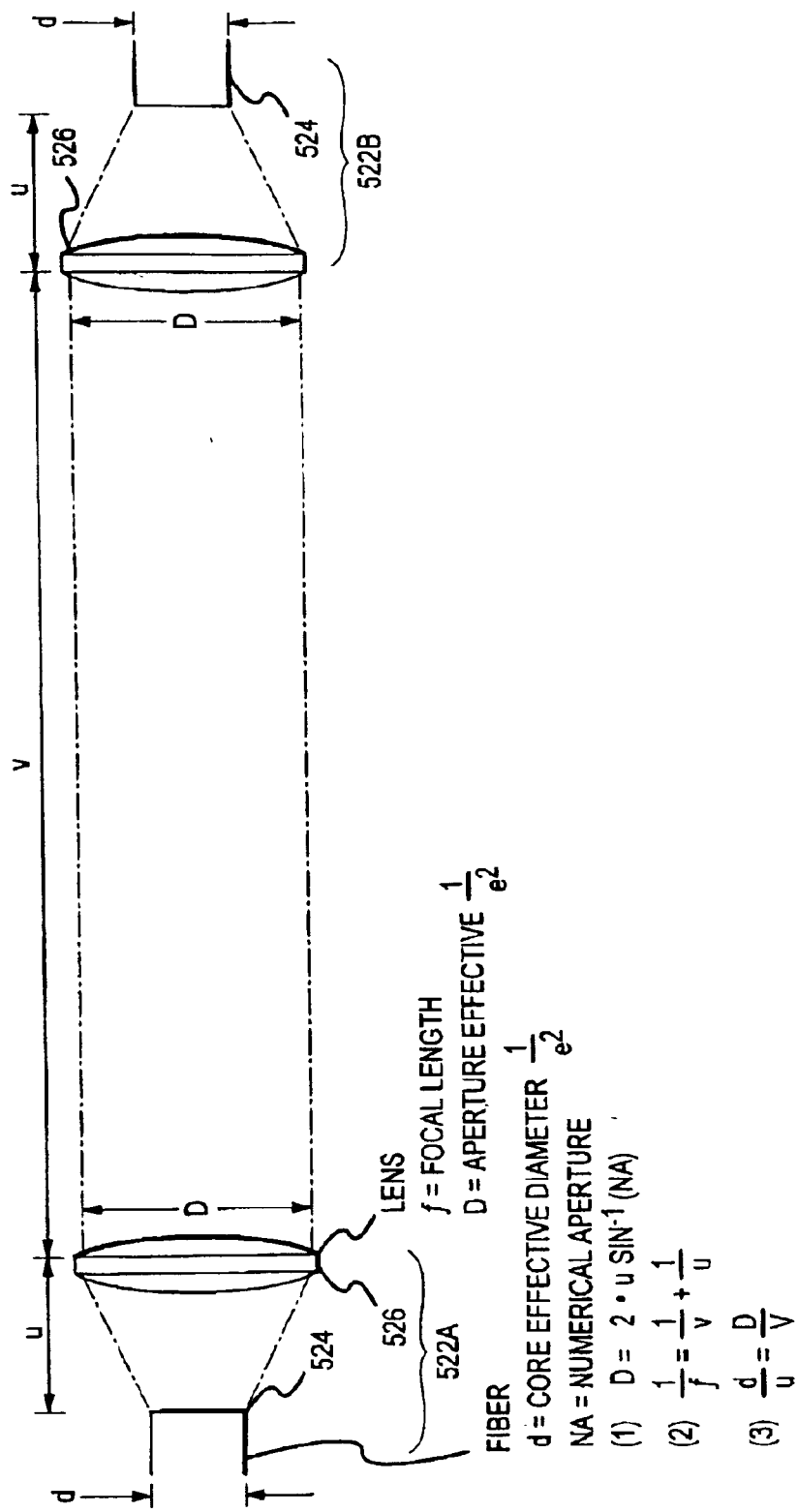
FIG. 11 illustrates a symmetrical pair of focused beam forming units in optical communication with one another.

In FIG. 11 there is shown a symmetrical system of substantially identical focused fiber beam forming units 522A, 522B where the fibers on each side have the same diameter of optical aperture, d, and numerical aperture N.A. Such a symmetrical system is preferred in order to facilitate optimal transmission efficiency of the optical signal between the focused fiber beam forming units 522A, 522B. Generally, optimum optical signal transmission efficiency is achieved when the following three equations are substantially satisfied, given certain practical constraints such as accommodating differing path lengths across the switch interface for different input fiber to output fiber switching combinations:

$$D = 2u \cdot \tan(\sin^{-1}(N.A.)) + d$$

$$1/f = 1/v + 1/u$$

$$d/u = D/v$$

D is the effective optical aperture of the focusing lenses 526. The distance between the lens 526 and the optical fiber end 524 of the first focused beam forming unit 522A as well as the distance between the lens 526 and the optical fiber end 524 of the second focused beam forming unit 522B is u. The distance between the lens 526 of the first focused beam forming unit 522A and the lens 526 of the second focused beam forming unit 522B is v. It will be appreciated that the value of v may vary depending on the particular switching combination under consideration and, in this regard, the focusing functionality described herein will be understood as encompassing such variations from true focusing functionality as may be desired to accommodate practical switch designs. NA is the numerical aperture of the optical fiber ends 524, and f is the focal length of the lenses 526. A thin lens approximation is assumed, and it is also assumed that D>>d. Further, if the beam carried in the optical fibers is a Gaussian beam, the effective values of d, D and NA are determined on a $1/e^2$ irradiance basis.

Substantial Alignment

In the embodiments described above, it is noted that when the optical signal is directed to the fiber end and/or fiber beam forming unit associated with the fiber end, it will propagate along an optical pathway having an axis that is in substantial alignment with an axis extending centrally from the end of the fiber output and/or lens of the fiber beam forming unit associated with the fiber output and will pass within the effective optical aperture diameter of the beam forming unit. Those skilled in the art will appreciate that it is sufficient to have substantial alignment where the angle, if any, between the axis of the optical pathway and the axis extending from the fiber output and/or lens is substantially smaller than the N.A. of the fiber and the pathway passes through the effective optical aperture diameter of the beam forming unit.

Figure 12:
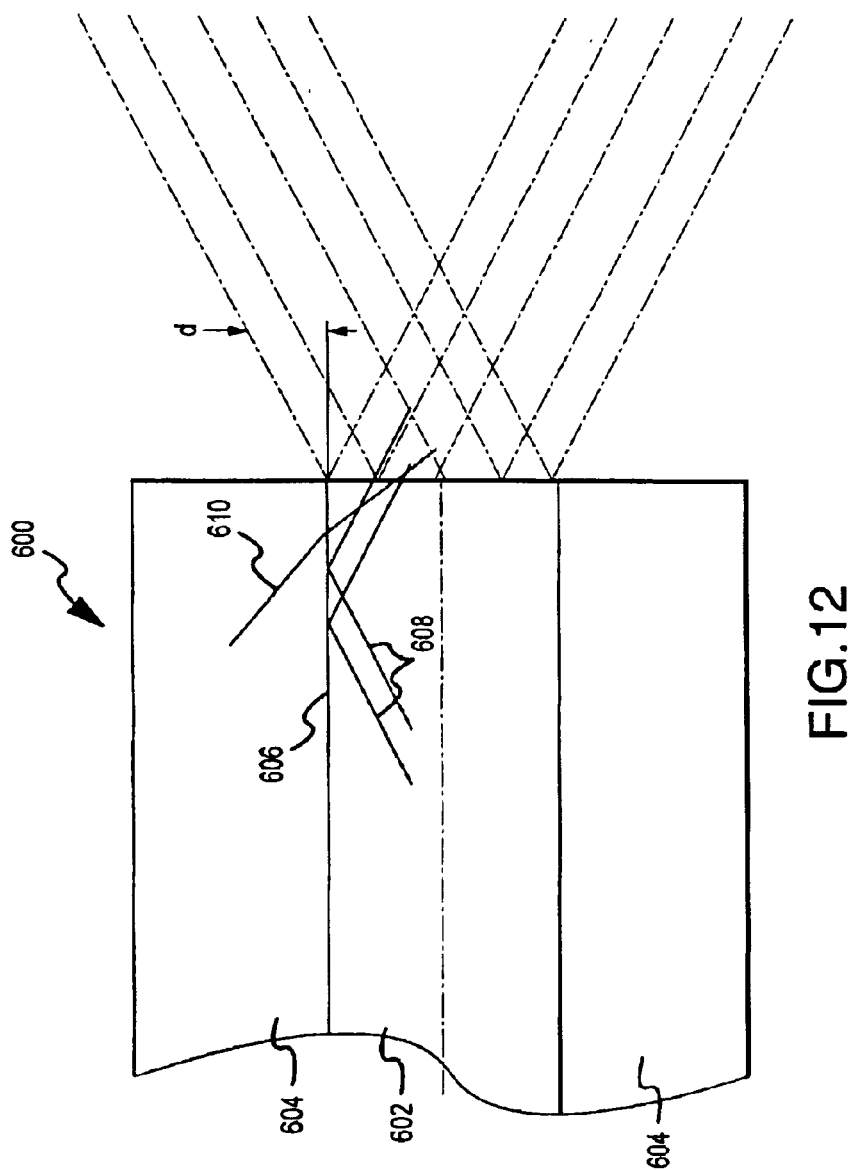
FIG. 12 is a cross-sectional view of a fiber illustrating the relationship between admittance and numerical aperture.
Figure 13:
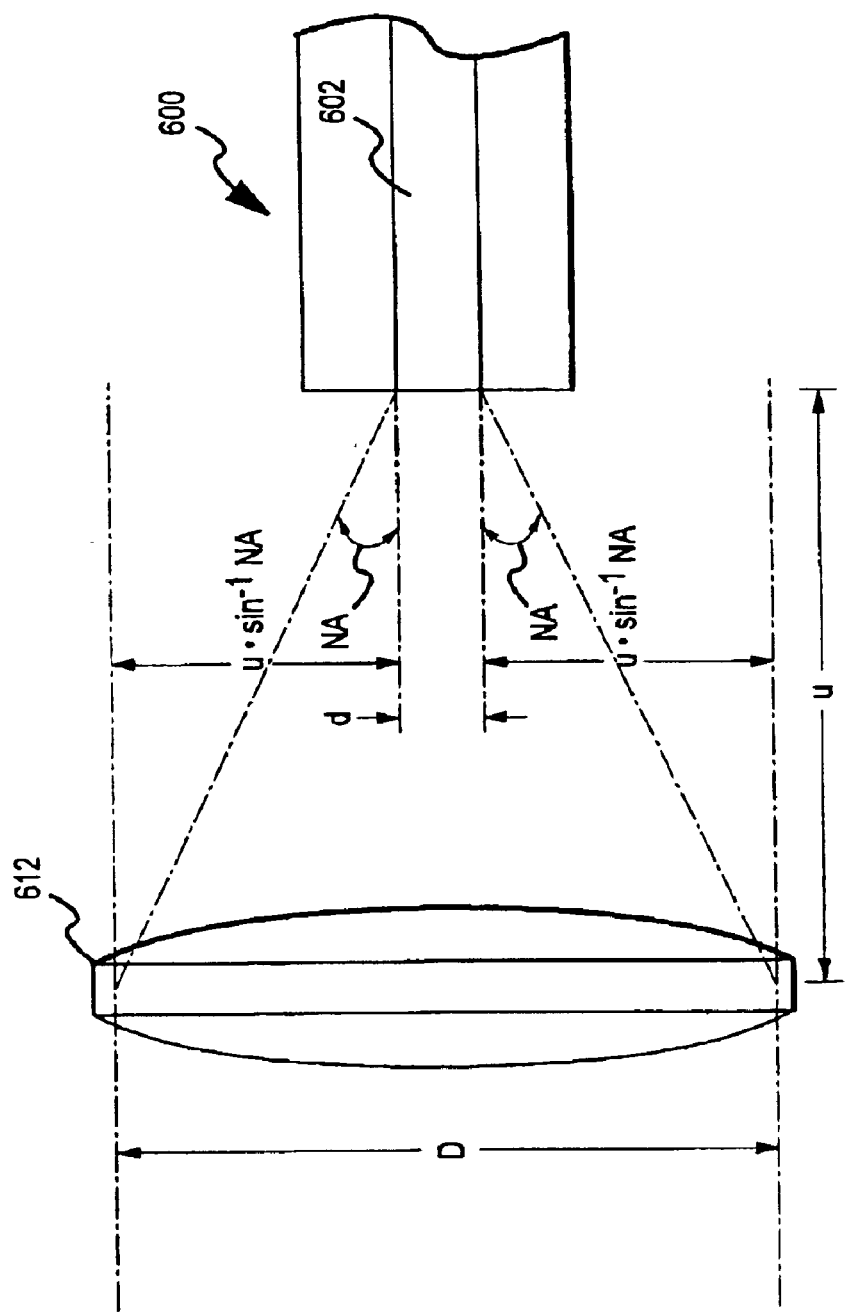
FIG. 13 illustrates various optical parameters relevant to the present invention.
Figure 14A:
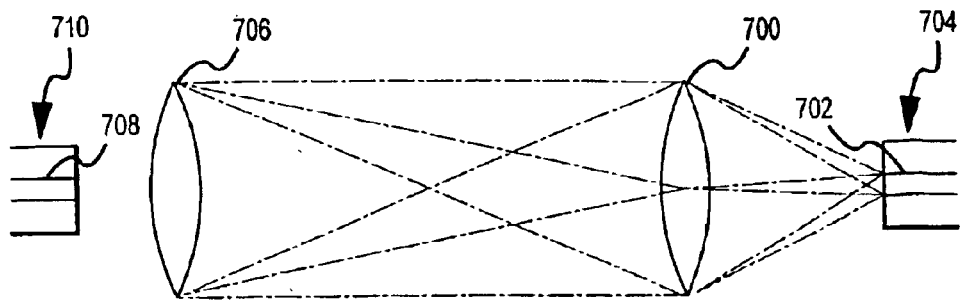
FIG. 14 illustrate an imaging relationship geometry in accordance with the present invention.
Figure 14B:
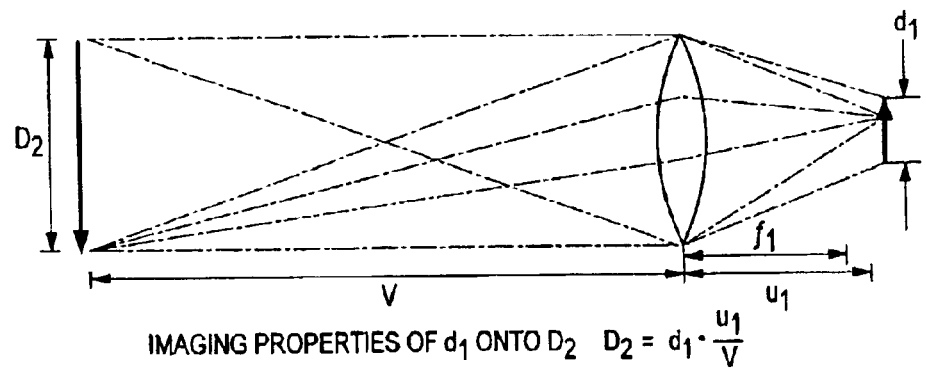
Figure 14C:
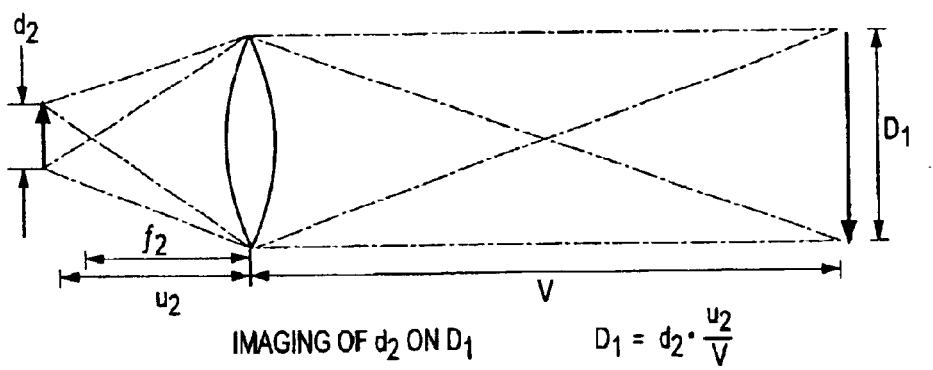

This may be better understood by reference to FIGS. 12–14. FIG. 12 is a cross sectional view of a fiber 600. The fiber includes a core 602 for carrying optical signals surrounded by cladding 604. In order to efficiently transmit optical signals along the length of the fiber 600, it is desirable to provide a high degree of reflectivity at the core/cladding interface 606, e.g., by forming the core 602 and cladding 604 from materials having differing indices of refraction or otherwise providing a reflective coating. As shown in FIG. 12, the illustrated interface 606 has a critical angle such that optical rays 608 having an angle of incidence less than the critical angle are transmitted through the core 602 and rays 610 having an angle of incidence greater than the critical angle are not transmitted through the core 602. This critical angle defines the "acceptance" angle of the fiber 600, α, the sim of which is desired as the fiber's numerical aperture.

FIG. 13 shows the fiber 600 and lens 612 geometry. As shown, an effective optical aperture diameter. D, of the lens 612 is defined by the optical aperture diameter, d, of the fiber core 602 and the numerical aperture NA.

Specifically, as noted above:

$$D = 2u \cdot \tan(\sin^{-1}(N.A.)) + d$$

Physically, this means that signals transmitted from the fiber 600 will pass within the area defined by D. Conversely, incoming optical signals that are substantially aligned with the fiber axis before entering the lens and passing within the area defined by D will be substantially accepted by the fiber 600.

Referring to FIG. 14, an imaging geometry in accordance with the present invention is shown. For purposes of illustration, a straight (unfolded) optical path connecting first and second fibers is shown and the beam directing units, e.g., mirror arrays, are omitted. As described above, the first beam forming unit 700 preferably images the core 702 of first fiber 704 onto the effective diameter $D_2$ of second beam directing unit 706. Similarly, the second beam directing unit 706 preferably images the core 708 of second fiber 710 onto the effective diameter $D_1$ of the first beam forming unit 700. It will be appreciated that, in the case of an N×N switch, the length of the optical path between the beam forming units, v, may vary somewhat depending upon the particular connection. However, substantial imaging can be achieved for all connections provided that the variation of v from path to path minimized, preferably to less than about 10%. This can be achieved, for example, by increasing the magnitude of v relative to the dimension of the fiber arrays. Where folded optical paths are employed, substantial imaging can be achieved in reasonably compact switches. As shown in FIG. 14, the beam forming unit 700 images the core 702 onto beam forming unit 706, and the beam forming unit 706 images the core 708 onto the beam forming unit 700. This is graphically depicted by the arrows and inverted arrows shown in the Figure. This is accomplished by satisfying the mathematical/geometric relationships set forth above. Such imaging enhances the optical efficiency of the switch.

While various embodiments of the present invention have been described in detail, it is apparent that further modifications and adaptations of the invention will occur to those skilled in the art. However, it is expressly understood that such modifications and adaptations are within the spirit and scope of the present invention.

What is claimed is:

1. An optical switch, comprising:

a plurality of input ports, each of said input ports including an end portion of an input optical fiber for transmitting an optical signal and input optics for receiving the optical signal transmitted by the optical fiber and forming the optical signal into an optical beam such that said first plurality of input ports provide a plurality of optical beams for transmission across a switch interface;

a plurality of optical signal output ports optically interfaced with said first plurality of input ports across said switch interface for receiving said plurality of optical beams; and a first plurality of moveable reflective beam directing units for receiving optical beams from said plurality of input ports selectively directing said plurality of optical beams such that any one of said plurality of input ports can be optically interconnected to any one of said plurality of output ports;

said first plurality of moveable reflective beam directing units being disposed within said switch interface between said plurality of input ports and said plurality of output ports;

said first plurality of beam directing units further being arranged in a first compact array separate from said plurality of input ports and said plurality of output ports;

said first plurality of moveable reflective beam directing units being disposed within said switch interface between said plurality or input ports and said plurality of output ports;

said first plurality of beam directing units further being arranged in a first compact array separate from said plurality of input ports and said plurality of output ports;

said first plurality of beam directing units being spaced from top-to-bottom and from side-to-side within said first array, wherein said first array is free from any structure of said input ports or said output ports interposed between said first plurality of beam directing units within said first array.

2. An optical switch that includes a first number of first ports and a second number of second ports where any of the first ports can be optically interconnected to any of the second ports for communication of optical signals therebetween, wherein each of said first ports and each of said second ports includes an optical fiber end for transmitting and receiving optical signals and optics for receiving signals from an associated fiber end and forming the signals into beams for transmission across a switch interface between the first ports and the second ports and for receiving incoming signals transmitted across the switch interface and condensing the incoming signals onto an end of the associated fiber, said optical switch comprising:

a first matrix including said first ports wherein said first ports are distributed from side-to-side and from top-to-bottom relative to a first matrix structure of said first matrix such that said first matrix has at least a two dimensional distribution of said first ports, said first matrix being disposed within a first area relative to a signal transmission pathway of a signal transmitted across said switch interface between said first ports and said second ports;

a second matrix including said second ports wherein said second ports are distributed front side-to-side and from top-to-bottom relative to a second matrix structure of said second matrix such that said second matrix has at least a two dimensional distribution of said second ports, said second matrix being disposed within a second urea relative to a signal transmission pathway of a signal transmitted across said switch interface between said first ports and said second ports; and an array of moveable reflective devices disposed on an array structure for use in selectively directing an optical signal between selected ones of said first ports and selected ones of said second ports so as to form optical connections therebetween, said array being disposed within a third area located between said first and second areas relative, to said signal transmission pathway such that said array is separated from said first matrix by a first distance and from said second matrix by a second distance.

3. A device for optically interconnecting selected pairs of optical signal paths from among multiple optical signal paths, the device including one or more beam-forming units positioned so as to be able to send or receive art optical signal along one or more of the multiple optical signal paths, and multiple individually controllable reflective beam-directing devices, each said reflective beam-directing device being movable relative to at least two axes and being positioned in an optical signal path of the multiple optical signal paths so as to be able to selectively optically connect said associated optical signal path with others of said multiple optical signal paths, wherein at least three of said reflective beam-directing devices are positioned within an area containing none of said one or more beam-forming units.

* * * * *

UNITED STATES PATENT AND TRADEMARK OFFICE
CERTIFICATE OF CORRECTION

PATENT NO. : 6,754,409 B2
DATED : June 22, 2004
INVENTOR(S) : Laor et al.

It is certified that error appears in the above-identified patent and that said Letters Patent is hereby corrected as shown below:

Column 13,
Lines 5-8, delete "said first plurality of moveable reflective beam directing units being disposed within said switch interface between plurality of input ports and said plurality of output ports;".
Lines 9-12, delete "said first plurality of beam directing units further being arranged in a first compact array separate from said plurality of input ports and said plurality of output ports;".

Column 14,
Line 5, delete "front", and insert -- from --.
Line 10, delete "urea", and insert -- area --.
Line 19, delete ",".
Line 26, delete "art", and insert -- an --.

Signed and Sealed this

Seventh Day of February, 2006

JON W. DUDAS
*Director of the United States Patent and Trademark Office*